US010486536B2

(12) United States Patent
Sugahara

(10) Patent No.: US 10,486,536 B2
(45) Date of Patent: Nov. 26, 2019

(54) ELECTRIC VEHICLE CONTROL DEVICE

(71) Applicant: Mitsubishi Electric Corporation, Chiyoda-ku, Tokyo (JP)

(72) Inventor: Tetsuo Sugahara, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 0 days.

(21) Appl. No.: 15/304,271

(22) PCT Filed: Jun. 17, 2014

(86) PCT No.: PCT/JP2014/066010
§ 371 (c)(1),
(2) Date: Oct. 14, 2016

(87) PCT Pub. No.: WO2015/193964
PCT Pub. Date: Dec. 23, 2015

(65) Prior Publication Data
US 2017/0036549 A1 Feb. 9, 2017

(51) Int. Cl.
B60L 1/00 (2006.01)
B60L 9/24 (2006.01)
(Continued)

(52) U.S. Cl.
CPC ............... B60L 9/24 (2013.01); B60L 15/06 (2013.01); H02M 1/4208 (2013.01);
(Continued)

(58) Field of Classification Search
CPC .... B60L 1/00; B60L 15/06; B60L 9/24; B60L 2210/20; B60L 2210/30; H02M 1/4208; H02M 5/4585; H02M 7/12
See application file for complete search history.

(56) References Cited

U.S. PATENT DOCUMENTS 4,729,082 A * 3/1988 Sato ..................... H02M 1/4233
363/41
6,053,002 A * 4/2000 Matsumoto .............. F24F 11/83
62/230
(Continued)

FOREIGN PATENT DOCUMENTS

EP    0 906 846 A1    4/1999
JP    7-274517 A      10/1995
(Continued)

OTHER PUBLICATIONS

International Search Report (PCT/ISA/210) dated Sep. 16, 2014, by the Japanese Patent Office as the International Searching Authority for International Application No. PCT/JP2014/066010.
(Continued)

Primary Examiner — Rexford N Barnie
Assistant Examiner — Elim Ortiz
(74) Attorney, Agent, or Firm — Buchanan Ingersoll & Rooney PC

(57) ABSTRACT

An electric vehicle control device includes: a main transformer to convert AC voltage input to an input winding thereof from an AC power source, and output converted AC voltage from each of a plurality of output windings; a plurality of converter main circuits, each connected to one of a plurality of secondary windings included in the output windings, to convert AC voltage output from connected secondary windings into DC voltage; and a plurality of converter controllers, each targeting for control one of the converter main circuits, to control by pulse width modulation the control-target converter main circuit, by comparing a signal wave and carrier wave. Each of the converter controllers determines a phase angle correction amount of the signal wave and/or the carrier wave, in response to
(Continued)

operating state of a load supplied power through a predetermined output winding among the output windings.

8 Claims, 17 Drawing Sheets

(51) Int. Cl.
    *H02M 7/12*    (2006.01)
    *H02M 1/42*    (2007.01)
    *H02M 5/458*   (2006.01)
    *B60L 15/06*   (2006.01)

(52) U.S. Cl.
    CPC ....... *H02M 5/4585* (2013.01); *B60L 2210/20* (2013.01); *B60L 2210/30* (2013.01); *Y02T 10/644* (2013.01); *Y02T 10/725* (2013.01); *Y02T 10/7241* (2013.01)

(56) References Cited

U.S. PATENT DOCUMENTS

| | | | | |
|---|---|---|---|---|
| 9,018,792 | B2 * | 4/2015 | Still | ................ B60L 1/003 180/65.1 |
| 10,075,097 | B2 * | 9/2018 | Matsuda | ............. H02M 5/4585 |
| 2011/0316333 | A1 | 12/2011 | Still | |
| 2012/0000739 | A1 | 1/2012 | Nogi et al. | |
| 2017/0033711 | A1 | 2/2017 | Matsuda et al. | |

FOREIGN PATENT DOCUMENTS

| | | |
|---|---|---|
| JP | 8-51703 A | 2/1996 |
| JP | 2000-217202 A | 8/2000 |
| JP | 2007-282434 A | 10/2007 |
| JP | 2010-130788 A | 6/2010 |
| JP | 2010-215013 A | 9/2010 |
| WO | WO 98/43848 A1 | 10/1998 |
| WO | 2015/079540 A1 | 6/2015 |

OTHER PUBLICATIONS

Written Opinion (PCT/ISA/237) dated Sep. 16, 2014, by the Japanese Patent Office as the International Searching Authority for International Application No. PCT/JP2014/066010.

Chinese Office Action dated Jun. 5, 2018, corresponding to Chinese Application No. 201480079939.X with English Translation (10 pages).

Extended European Search Report dated Jan. 17, 2018, issued by the European Patent Office in corresponding European Application No. 14895214.6. (8 pages).

Office Action dated May 22, 2019, by the India Patent Office in corresponding India Patent Application No. 201647041046 including an English translation of the Office Action. (6 pages).

\* cited by examiner

ELECTRIC VEHICLE CONTROL DEVICE

TECHNICAL FIELD

The present disclosure relates to an electric vehicle control device.

BACKGROUND ART

A control device, for an electric vehicle that runs by receiving AC power from an overhead line, generally is equipped with a main transformer for changing an AC voltage received from the overhead line. In many cases, the main transformer has secondary windings, each connected to a converter of a plurality of converters, and has a tertiary winding connected to a supplementary power supply. A pulse width modulation (PWM) converter is widely used in the converter connected to the secondary winding.

By operation of switching elements constituting circuitry of the PWM converter, a harmonic can be generated in a primary current flowing through a primary winding of the transformer. For example, Patent Literature 1 teaches a method for control of a PWM converter in order to cause a decrease of a harmonic component of the primary current.

In the method for control of the PWM converter described in Patent Literature 1, a modulation wave used for pulse width modulation control in a plurality of PWM converters is set to the same phase as that of the power supply voltage. Also, this method of control sets a predetermined phase difference between groups of PWM converters allocated among driven cars constituting a train, for a carrier wave used for pulse width modulation control of the PWM converters.

Further, generally strongly coupled windings among the secondary windings and the tertiary winding are affected by mutual inductance. Each of the strongly coupled windings is affected by mutual inductance if the operating state is non-uniform for the loads supplied with power, and thus the phase differences of the currents flowing in each of the windings may deviate from the predetermined values. Thus the method of control of PWM converters described in Patent Literature 1 possibly does not sufficiently decrease the harmonic component of the primary current.

Weak coupling between each of the secondary windings and the tertiary winding in order to decrease the effect of this type of mutual inductance is effective for making each of the mutual inductances nearly zero. Thus there are cases in which a separator and the like is arranged between each of the secondary and tertiary windings.

CITATION LIST

Patent Literature

Patent Literature 1: Unexamined Japanese Patent Application Kokai Publication No. H8-51703

SUMMARY OF INVENTION

Technical Problem

However, a transformer equipped with separators and the like to decrease the effect of mutual inductance has problems such as large size, heavy weight and high manufacturing cost.

In consideration of the aforementioned circumstances, the object of the present disclosure is to provide an electric vehicle control device capable of decreasing the harmonic component of the primary current, even without the implementation of countermeasures for decreasing mutual inductance between windings of the transformer.

Solution to Problem

In order to achieve the aforementioned object, the electric vehicle control device of the present disclosure includes:

a main transformer to convert an input AC voltage, input to an input winding from an AC power supply, and to output an output AC voltage converted thereby from each of a plurality of output windings;

a plurality of converter main circuits, each connected to one of a plurality of secondary windings included in the plurality of output windings, to convert the output AC voltage, output from the secondary winding connected to the converter main circuit, into a DC voltage; and a plurality of converter controllers, each to control as a control target one of the plurality of converter main circuits, by pulse width modulation control by comparison between a signal wave and a carrier wave.

Each of the plurality of converter controllers is further to determine a correction amount of a phase angle of at least one of the signal wave and the carrier wave, in response to an operating state of a load that is supplied power through a predetermined output winding among the plurality of output windings.

Advantageous Effects of Invention

According to the present disclosure, in response to the operating state of the load that receives supplied power through a predetermined output winding, each converter controller determines a correction amount of the phase angle of at least one of a signal wave and a carrier wave. This configuration enables correction of phase of current passing through each of the secondary windings, in response to the operating state of the load receiving supplied power through the predetermined output winding. Thus even if there exist secondary windings that are strongly coupled with the predetermined output winding, the phase differences between secondary currents caused by the effect of mutual inductance can be maintained at values that decrease the harmonic component of the primary current. Thus decrease of the harmonic component of the primary current becomes possible, even without implementation of countermeasures for decrease of mutual inductance between windings of the transformer.

DESCRIPTION OF EMBODIMENTS

Embodiments of the present disclosure are described below in reference to figures. In all the figures, elements that are the same are assigned the same reference signs.

Embodiment 1

Figure 1:
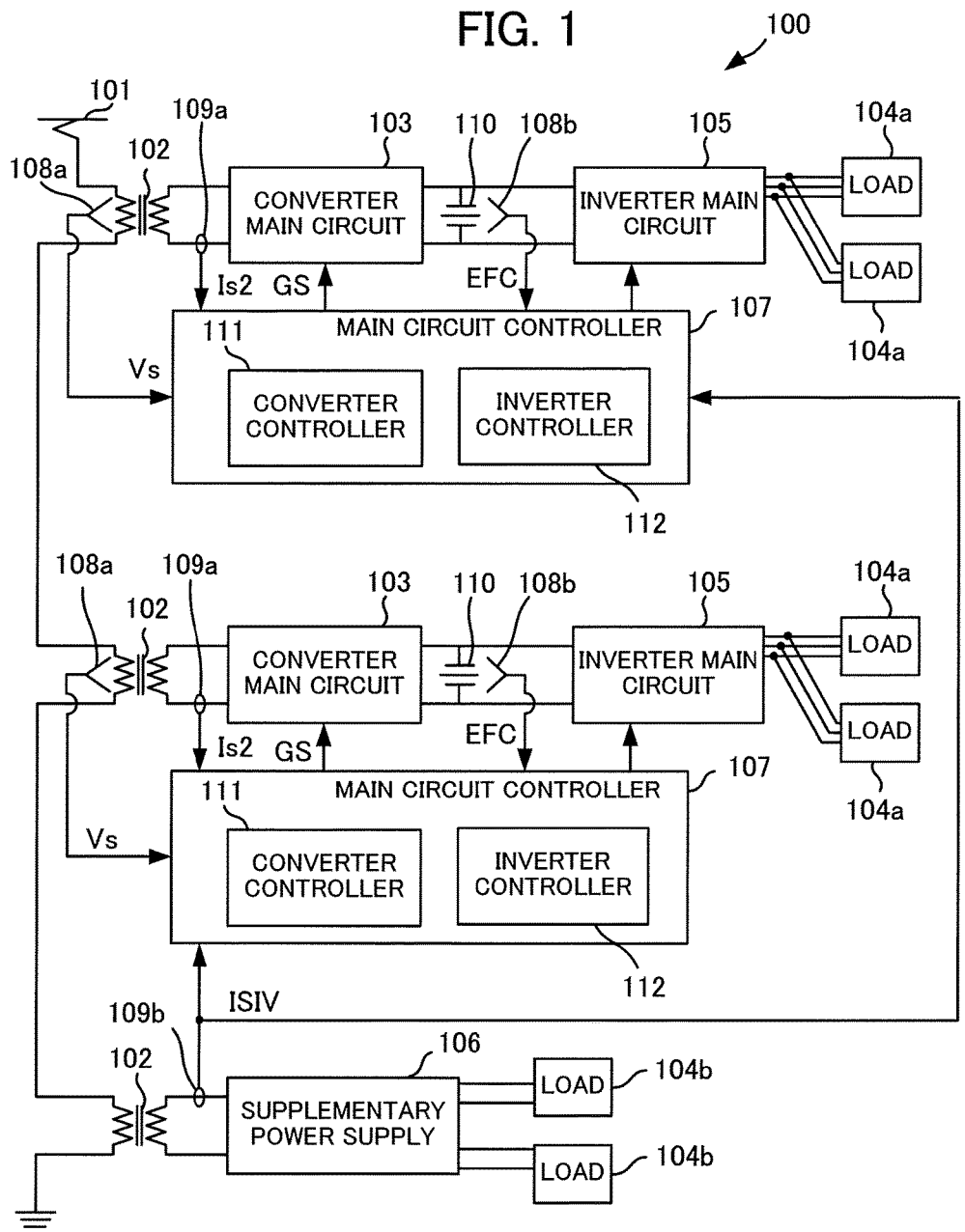
FIG. 1 is a diagram illustrating a configuration of an electric vehicle control device of Embodiment 1 of the present disclosure.

An electric vehicle control device 100 (referred to hereinafter simply as the "control device") of Embodiment 1 of the present disclosure is a device for control of an AC current electric vehicle. As illustrated in FIG. 1, the control device 100 is equipped with:

a main transformer 102 that converts voltage of AC power received from an AC power supply through a current collector 101;

two converter main circuits 103 that each convert, into DC power, the AC power output from the main transformer 102;

two inverter main circuits 105, that convert, into AC power, the DC power output from each of the two converter main circuits 103, and that each supply the inverted AC power to a respective pair of loads 104a, each load 104a of the pair being connected to the respective inverter main circuit 105;

a supplementary power supply 106 that receives the AC power output from the main transformer 102, and that supplies power to two loads 104b that are each connected to the supplementary power supply 106; and two main circuit controllers 107, each of which is associated with a converter main circuit 103 and inverter main circuit 105 control target set, each main circuit controller 107 controlling the converter main circuit 103 and inverter main circuit 105 as the control target set.

The current collector 101 is a pantograph that receives AC power from an overhead line. Further, the current collector 101 may be any equipment that receives AC power from an AC power supply, and such equipment, for example, may be a contact shoe and the like that receives power from a third rail as the AC power supply.

Each of the loads 104a is an induction motor and the like that drives an electric vehicle. Each of the loads 104a is electrically connected to a single converter main circuit 103 through a single inverter main circuit 105, and due to this configuration, each of the loads 104a receives a supply of power through a secondary winding to which the converter main circuit 103 is electrically connected. Each of the loads 104a can be driven by receiving electricity in this manner.

Each of the loads 104b is equipment, such as an air conditioner, a light and the like, suitably installed in the electric vehicle. Each of the loads 104b is electrically connected to a single supplementary power supply 106, and receives power supplied through a tertiary winding. Due to the receiving of electricity in this manner, each of the loads 104b can be driven.

The main transformer 102 converts the AC voltage, input by the AC power supply into input windings, and outputs the converted AC voltage from each of three output windings.

Specifically, the main transformer 102 has a primary winding as an input winding used for input of AC voltage through the current collector 101, and has three output windings that output the converted AC voltage. The output windings of the present embodiment include: two secondary windings, each connected to one of the two converter main circuits 103, and one tertiary winding connected to the supplementary power supply 106.

As illustrated in the same figure, a voltage sensor 108a for measurement of an overhead line voltage Vs, which is the voltage value of power received by the current collector 101, is arranged at the primary winding of the main transformer 102. That is to say, the overhead line voltage Vs is the voltage of input to (applied voltage to) the primary winding. The voltage sensor 108a outputs to the main circuit controller 107 the overhead line voltage signal indicating the measured overhead line voltage Vs.

At each of the secondary windings of the main transformer 102, a current sensor 109a is arranged for measurement of a secondary current Is2, Is2 being the magnitude of current flowing through the secondary winding. That is to say, the secondary current Is2 is the current flowing to the converter main circuit 103 connected to the secondary winding. The current sensor 109a outputs to the main circuit controller 107 a secondary current signal indicating the measured secondary current Is2.

At the tertiary winding of the main transformer 102, a current sensor 109b is arranged for measurement of a supplementary equipment current ISIV, ISIV being the magnitude of current flowing through the tertiary winding. The current sensor 109b outputs to the main circuit controller 107 a supplementary equipment current signal indicating the measured supplementary equipment current ISIV.

Each of the converter main circuits 103, for example, is constructed from semiconductor switching elements, diodes and the like. The semiconductor switching element, for example, is an element such as an insulated gate bipolar transistor (IGBT).

Each of the converter main circuits 103 switches the semiconductor switching elements ON and OFF under pulse width modulation (PWM) type control by the main circuit controller 107 provided in association with the converter main circuit 103. Each of the converter main circuits 103 thus converts the AC voltage output from the connected secondary winding to a DC voltage of a preset DC voltage target value (target voltage) ECP.

The inverter main circuits 105, for example, are constructed from semiconductor switching elements, diodes and the like. The inverter main circuits 105 each receive DC power from the converter main circuits 103 through filter condensers 110 for stabilization of DC current. Each of the inverter main circuits 105 operates under variable voltage variable frequency (VVVF) type control by the main circuit controller 107 provided in association with the inverter main circuit 105. Thus the received DC current is converted and output as three-phase AC power, and the load 104a is controlled.

For each of the filter condensers 110, a voltage sensor 108b is arranged for measurement of a DC voltage EFC, the measurement being the magnitude of the DC voltage output from the converter main circuit 103 connected to each of the filter condensers 110. The voltage sensor 108b outputs, to the main circuit controller 107, a DC voltage signal indicating the measured DC voltage EFC.

Each of the main circuit controllers 107, as illustrated in the same figure, is associated with control targets, a single converter main circuit 103 and a single inverter main circuit 105, by connection through signal lines. Each of the main circuit controllers 107 has: a converter controller 111 that uses PWM type modulation control to control the control-target converter main circuit 103, and an inverter controller 112 that uses VVVF type control to control the control-target inverter main circuit 105.

The converter controller 111 characteristic of the present disclosure is described below.

The converter controller 111 functions by comparing a signal wave and a carrier wave, and using the PWM method to control the control-target converter main circuit 103 on the basis of results of the comparison.

Figure 2:
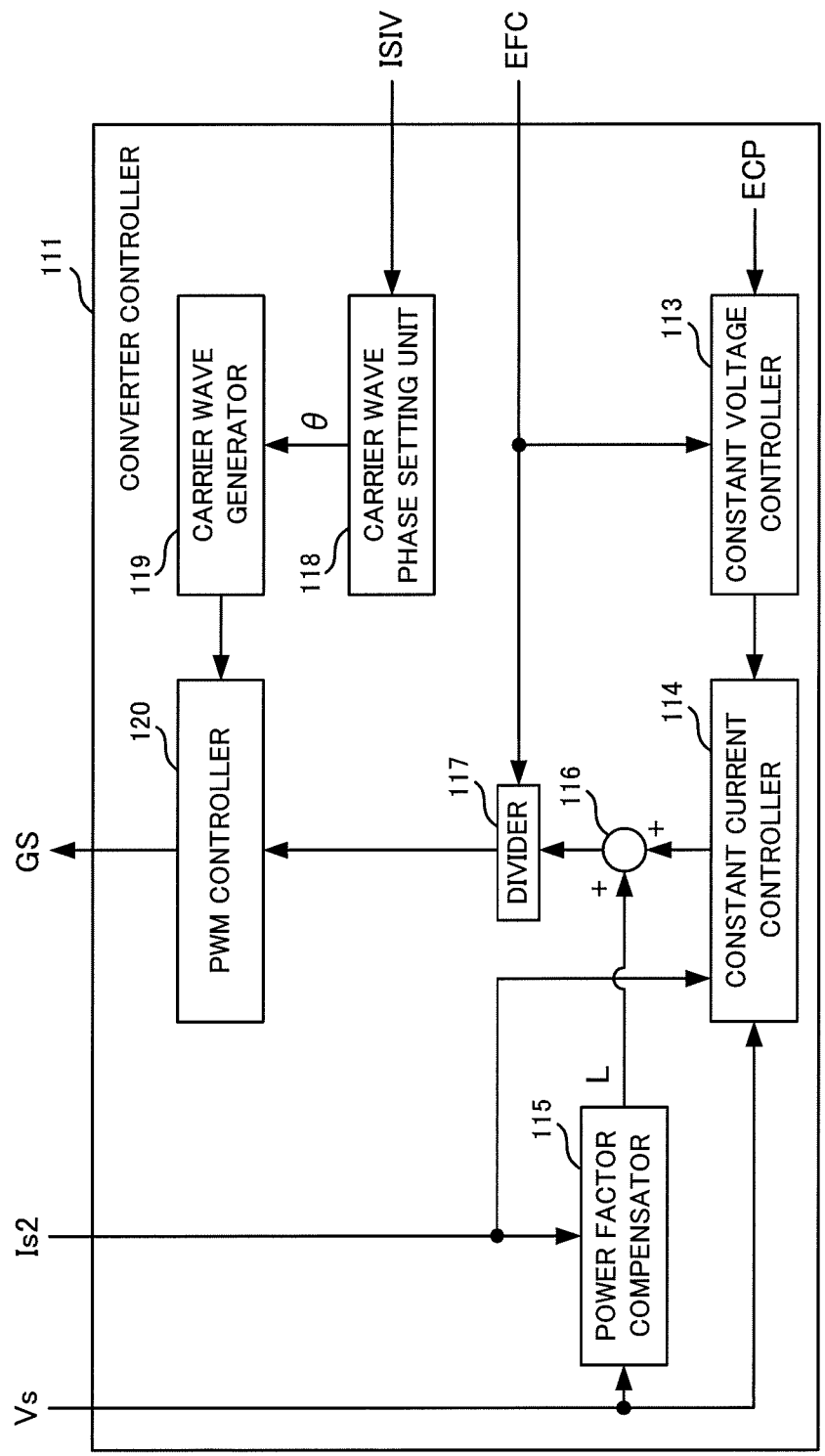
FIG. 2 is a diagram illustrating a configuration of a converter controller of Embodiment 1.

In particular as illustrated in FIG. 2, the converter controller 111 has:

a constant voltage controller 113 that generates an electric current command in order to set the DC voltage EFC to the DC voltage target value ECP;

a constant current controller 114 that generates a pre-power-factor-compensation voltage command that indicates a sine wave for causing the converter main circuit 103 to output current of the waveform indicated by the electric current command;

a power factor compensator 115 that calculates a leakage inductance L for power factor compensation to set the power factor based on the overhead line voltage Vs and the current Is2 to 1;

an adder 116 that calculates a post-power-factor-correction sine wave by addition of the leakage inductance L to the pre-power-factor-compensation sine wave indicated by the voltage command;

a divider 117 that uses the DC voltage EFC to normalize the post-power-factor-correction sine wave;

a carrier wave phase setting unit 118 that determines a phase angle of the carrier wave in response to an operating state of the load 104b receiving the supply of power from the tertiary winding as the predetermined output winding of the main transformer 102;

a carrier wave generator 119 that generates a carrier wave command indicating the carrier wave with the phase corresponding to a phase angle θ of the carrier wave; and a PWM controller 120 that compares the signal wave and the carrier wave, and that outputs to the control-target converter main circuit 103 a main circuit operation command GS in response to results of the comparison.

The constant voltage controller 113 retains the preset DC voltage target value ECP. The constant voltage controller 113 acquires the DC voltage signal from the voltage sensor 108b. The constant voltage controller 113 executes proportional-integral (PI) control on the basis of the deviation of the DV voltage EFC, indicated by the acquired DC voltage signal, from the DC voltage target value ECP. The constant voltage controller 113, by this means, generates an electric current command indicating waveform of the current to be output from the converter main circuit 103, and outputs the electric current command to the constant current controller 114.

The constant current controller 114 acquires the overhead line voltage signal from the voltage sensor 108a and the secondary current signal from the current sensor 109a. The constant current controller 114 acquires the electric current command output from the constant voltage controller 113. Based on the secondary current Is2 indicated by the acquired overhead line voltage signal, the overhead line voltage Vs indicated by the acquired overhead line voltage signal, and the waveform of the current indicated by the acquired electric current command, the constant current controller 114 generates the pre-power-factor-compensation voltage command that indicates the pre-power-factor-compensation sine wave. The constant current controller 114 outputs, to the adder 116, the generated pre-power-factor-compensation voltage command.

The power factor compensator 115 acquires the overhead line voltage signal from the voltage sensor 108a and the secondary current signal from the current sensor 109a. The power factor compensator 115 calculates the leakage inductance L used for power factor compensation to set the power factor to 1 based on the secondary current Is2 indicated by the acquired overhead line voltage signal and the overhead line voltage Vs indicated by the acquired overhead line voltage signal. The power factor compensator 115 outputs a power factor compensation signal indicating the leakage inductance L for power factor compensation obtained by the calculation.

The adder 116 acquires the pre-power-factor-compensation voltage command from the constant current controller 114 and the power factor compensation signal from the power factor compensator 115. The adder 116 calculates a post-power-factor-correction sine wave by addition of the leakage inductance L used for the power factor compensation, indicated by the acquired power factor compensation signal, to the pre-power-factor-compensation sine wave indicated by the acquired pre-power-factor-compensation voltage command. The adder 116 generates the post-power-factor-compensation voltage command indicating the post-power-factor-compensation sine wave obtained by the calculation, and outputs the post-power-factor-compensation voltage command to the divider 117.

Here, the phase angle of the pre-power-factor-compensation sine wave is corrected by the adder 116 adding the leakage inductance L. The power factor based on the overhead line voltage Vs and the current Is2 can be made nearly 1 by adopting, for PWM control, the signal wave on the basis of the sine wave (post-power-factor-compensation sine wave) corrected in this manner.

The divider 117 acquires the post-power-factor-compensation voltage command from the adder 116 and the DC voltage signal from the voltage sensor 108b. The divider 117 calculates the normalized sine wave (signal wave) for the PWM control by dividing the sine wave indicated by the acquired post-power-factor-compensation voltage command by the DC voltage EFC indicated by the acquired DC voltage signal. The divider 117 generates the voltage command for the PWM control that indicates the signal wave obtained by the calculation, and outputs the generated voltage command for the PWM control to the PWM controller 120.

The carrier wave phase setting unit 118 determines the phase angle of the carrier wave on the basis of the supplementary equipment current ISIV as a value indicating the operating state of the load 104b.

Figure 3:
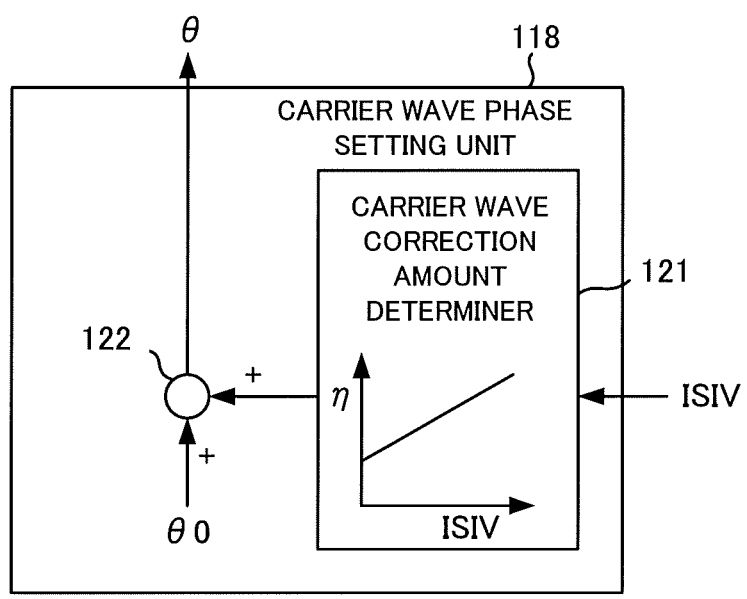
FIG. 3 is a diagram illustrating a configuration of a carrier wave phase setting unit of Embodiment 1.

As illustrated in detail in FIG. 3, the carrier wave phase setting unit 118 has: a memory that retains beforehand information indicating an initial value (initial setting value) θ0 of the carrier wave phase angle, a carrier wave correction amount determiner 121 that determines a carrier wave correction amount η on the basis of the supplementary equipment current ISIV, and a adder 122 as a calculator that calculates the phase angle of the carrier wave on the basis of the initial value θ0 of the carrier wave phase angle and the carrier wave correction amount η.

The initial value θ0 of the carrier wave phase angle is typically a value that differs for each main circuit controller 107 for which the initial value θ0 is set (that is to say, for example, differs for each train car of a train). In the case in which two secondary windings are arranged for the main transformer 102 as in the present embodiment, for example, the initial value θ0 of one converter controller 111 is set to 0 degrees, and the initial value θ0 of the other converter controller 111 is set to 90 degrees.

As illustrated in the same figure, the carrier wave correction amount determiner 121 retains beforehand carrier wave correction amount data indicating a relationship between the supplementary equipment current ISIV and the carrier wave correction amount η. The relationship indicated by the carrier wave correction amount data may be expressed as a formula, table and the like. Further, although the carrier wave correction amount η in the present embodiment is expressed by an angle, the carrier wave correction amount η may be expressed by time, for example.

As illustrated in the same figure, the relationship indicated by the carrier wave correction amount data is a relationship in which the carrier wave correction amount η increases with increase in the supplementary equipment current ISIV. This type of relationship can be expressed, for example, by a straight line as illustrated in the same figure, in which the supplementary equipment current ISIV is plotted on the horizontal axis, and the carrier wave correction amount η is plotted on the vertical axis. In this case, the rate of change of the carrier wave correction amount η with respect to the supplementary equipment current ISIV corresponds to the slope of the straight line. The slope of the straight line may be set to different values for each main circuit controller 107 for which the straight line is set (that is to say, for example, differs for each train car of a train).

The carrier wave correction amount determiner 121 acquires the supplementary equipment current signal from the current sensor 109b and determines the carrier wave correction amount η in response to the supplementary equipment current ISIV, on the basis of the supplementary equipment current ISIV indicated by the acquired supplementary equipment current signal and the carrier wave correction amount data.

The adder 122 adds the initial value θ0 of the carrier wave phase angle to the carrier wave correction amount η determined by the carrier wave correction amount determiner 121, and determines, as the carrier wave phase angle θ, the value obtained by the addition. The adder 122 outputs, to the carrier wave generator 119, a carrier wave phase angle command that indicates the determined carrier wave phase angle θ. Thus the determined carrier wave phase angle θ is set in the carrier wave generator 119.

FIG. 2 is referred to below. The carrier wave generator 119 refers to the carrier wave phase angle θ indicated by the carrier wave phase angle command set by the carrier wave phase setting unit 118. The carrier wave generator 119 generates a carrier wave command that indicates a triangular wave of a phase angle corresponding to the phase angle θ of the referenced carrier wave. Here, the phase angle of the triangular wave indicated by the generated carrier wave command is, for example in the case in which the carrier wave phase angle θ is zero, the phase angle obtained by adding the carrier wave phase angle θ to the phase (standard value) of the carrier wave generated by the carrier wave generator 119. The carrier wave generator 119 outputs the generated carrier wave command to the PWM controller 120.

The PWM controller 120 acquires the voltage command for PWM control from the divider 117, and acquires the carrier wave command from the carrier wave generator 119. The PWM controller 120 compares the carrier wave, indicated by the acquired carrier wave command, and the signal wave indicated by the acquired voltage command for PWM control. Based on results of the comparison, the PWM controller 120 generates a main circuit operation command GS in order to control switching operation of the control-target converter main circuit 103. The PWM controller 120 outputs the generated main circuit operation command GS to the converter main circuit 103 that is the target of control. The converter controller 111 by this means performs PWM control of the control-target converter main circuit 103.

This type of converter controller 111 may be physically configured, for example, from at least one processor, a read only memory (ROM) that stores beforehand various types of data, a random access memory (RAM) as a working region of the processor, an interface for exchange of signals between sensors and the converter main circuit 103, and the like. The functions of the converter controller 111 may be realized by execution of a software program contained in the ROM, for example. Further, each of the converter controllers 111 is equipped with roughly the same mechanical and physical configuration.

In the present embodiment, each of the converter controllers 111 determines the correction amount of the phase angle of the carrier wave for PWM control, in response to the supplementary equipment current ISIV. This configuration thus enables, in response to the supplementary equipment current ISIV, correction of the phase of current flowing through each of the secondary windings of the main transformer 102. Thus even in the case in which the secondary windings are strongly coupled to the tertiary winding, the phase differences of the secondary currents occurring due to the effects of mutual inductance can be maintained at values that decrease the harmonic of the primary current. Thus the harmonic component of the primary current can be decreased even when countermeasures for decreasing mutual inductance between windings are not implemented for the main transformer 102.

Figure 4:
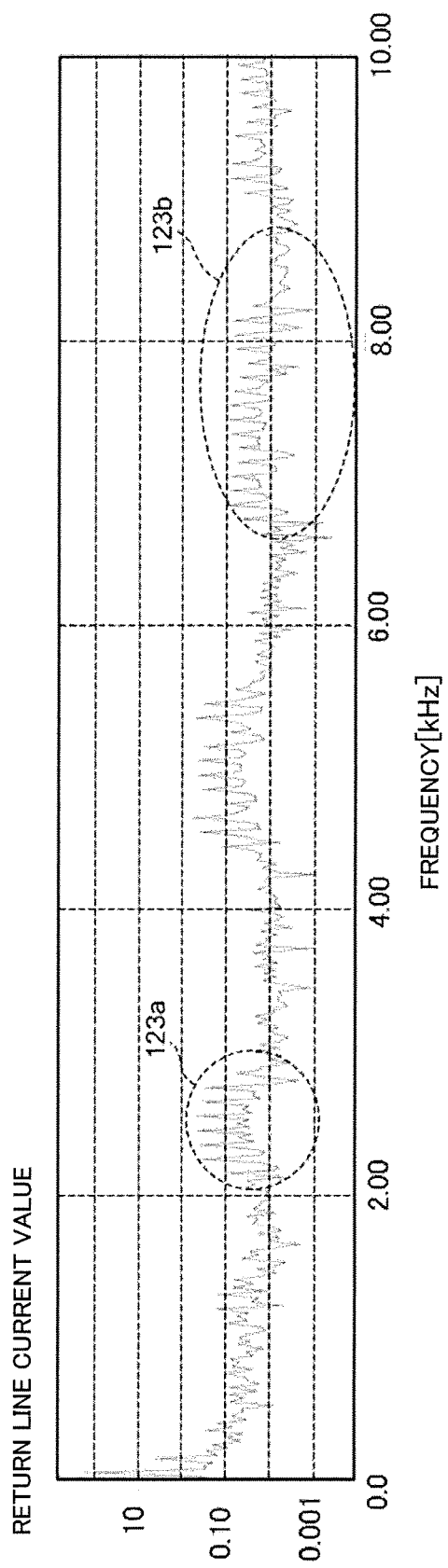
FIG. 4 is a diagram illustrating results of a simulation of a return line current obtained using a conventional control device.
Figure 5:
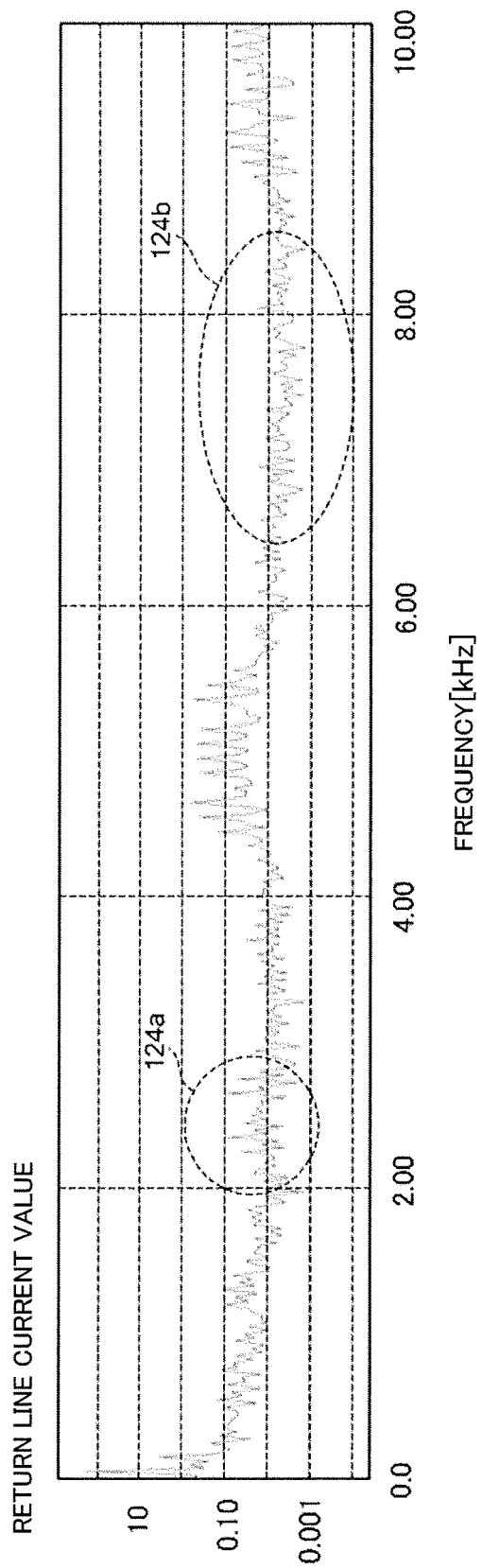
FIG. 5 is a diagram illustrating results of a simulation of a return line current obtained using the control device of Embodiment 1.

FIGS. 4 and 5 illustrate relationships between frequency of the return line current and magnitude of the return line current (return line current value), as results of simulations in which the degrees of coupling between the two secondary windings and the tertiary winding are similar. FIG. 4 is an example of results of a simulation using a conventional control device, in which the carrier wave phase setting unit 118 is not equipped with the carrier wave correction amount determiner 121. FIG. 5 is an example of results of a simulation using the control device 100 of the present embodiment. The carrier wave frequency in the simulation is set to 1,250 Hz.

As may be understood by comparison between regions indicated by dotted lines 123*a* and 124*a* of FIG. 4 versus regions indicated by dotted lines 123*b* and 124*b* of FIG. 5, harmonics of the primary current decrease in the vicinity of 2,500 Hz and 7,500 Hz for the control device 100 of the present embodiment. The present embodiment in this manner enables a decrease of the harmonic component of the primary current, even when countermeasures to lower mutual inductance between windings of the main transformer 102 are not implemented.

The results of this simulation are for an example in which two secondary windings are arranged in the aforementioned manner. However, in the case of arrangement of four secondary windings, for example, the harmonic of the primary current in the vicinity of 5,000 Hz can be decreased.

In the present embodiment, power factor compensation is performed by causing change of the phase of the signal wave, and thus the power factor based on the overhead line voltage Vs and the current Is2 can be made to be 1.

Generally, each of the secondary windings is more strongly affected by mutual inductance with the tertiary winding as the supplementary equipment current ISIV increases. As a result, phase shift of the secondary current increases as the supplementary equipment current ISIV increases.

In the present embodiment, the carrier wave correction amount η increases as the supplementary equipment current ISIV increases. Thus the phase differences of the currents flowing through each of the secondary windings can be maintained at values that decrease the harmonic of the primary current. Thus decrease of the harmonic component of the primary current becomes possible, even without implementation of countermeasures for decrease of mutual inductance between the windings of the main transformer 102.

Generally, rather than changing just due to the supplementary equipment current ISIV, phase differences of the currents flowing through each of the two secondary windings also change due to mutual inductance between each of the secondary windings and the tertiary winding, and the like.

In the present embodiment, the relationship between the supplementary equipment current ISIV and the carrier wave correction amount η can be set separately for each main circuit controller 107. That is to say, for example, when the relationship between the supplementary equipment current ISIV and the carrier wave correction amount η is expressed by a straight line as illustrated in FIG. 3, the slope of this straight line, a value of the carrier wave correction amount η when the supplementary equipment current ISIV is zero, and the like can be set. Setting in this manner enables including of mutual inductance effects and the like in the relationship between the supplementary equipment current ISIV and the carrier wave correction amount η. Thus phase differences of the currents flowing through each of the secondary windings can be maintained at values that decrease the harmonic component of the primary current. Thus the harmonic component of the primary current can be decreased even without implementation of countermeasures to decrease the mutual inductances between windings of the main transformer 102.

According to the present embodiment, the phase angle of the carrier wave is determined by correction for the initial value θ0. The adoption of the initial value θ0 enables setting the carrier wave phase for each converter controller 111. Setting of a different phase difference for each converter controller 111 enables the setting beforehand of phase differences that decrease the harmonic of the primary current.

Although the control device 100 of Embodiment 1 of the present disclosure is described above, the present disclosure is not limited to Embodiment 1, and the below described modifications are permissible.

For example, an example is described in Embodiment 1 in which there are two converter main circuits 103, and two loads 104*a* are connected to each converter main circuit 103. However, the number of converter main circuits 103 and the number of loads 104*a* connected to each converter main circuit 103 may be varied appropriately. Further, each of the converter main circuits 103 is normally controlled by a separate main circuit controller 107, and thus the number of the main circuit controllers 107 may be varied appropriately in response to the number of the converter main circuits 103.

For example, an example is described in Embodiment 1 in which two loads 104*b* are connected to the supplementary power supply 106. However, the number of loads 104*b* connected to the supplementary power supply 106 may be varied appropriately.

For example, the number of the output windings is not limited to 3. As in Embodiment 1, a single converter main circuit 103 is often connected electrically to a single secondary winding. In such a configuration, the number of the secondary windings of the main transformer 102 is the same as the number of the converter main circuits 103 of the control device 100. Further, the supplementary winding included in the output windings is not limited to a single tertiary winding, and there may be multiple tertiary windings.

For example, an example is described in the present embodiment in which the carrier wave phase angle θ is determined by the carrier wave phase setting unit 118 adding the correction amount to the θ0 initial value. However, the carrier wave phase angle θ may be determined by subtraction of the carrier wave correction amount η from the initial value θ0.

For example, the carrier wave phase angle θ may be calculated directly on the basis of the carrier wave correction amount data and the supplementary equipment current ISIV, without presetting the initial value θ0. In this case, for example, the carrier wave correction amount η in the case of zero supplementary equipment current ISIV may be set to a value corresponding to the initial value θ0.

Modified Example 1

The value indicating the operating state of the load 104*b* being supplied power through the tertiary winding as the predetermined output winding of the main transformer 102 is not limited to the supplementary equipment current ISIV, which is the current (output current) output from the tertiary winding. For example, in place of the supplementary equipment current ISIV, power consumption of the load 104*b*, power (supply power) supplied through the tertiary winding, and the like may be adopted as the value indicating the operating state of the load 104*b*.

The power consumption of the load 104*b*, or the power supplied through the tertiary winding, may be calculated on the basis of information from various types of sensors, and may be acquired from a power meter. The power consumption of the load 104*b* is normally electronically transmitted from the load 104*b* to a driver's cab and may be acquired from the driver's cab using the electronic transmission and the like. The supplementary equipment current ISIV, as well as the power supplied through the tertiary winding, may be acquired from the driver's cab.

The present modified example also has effects similar to those of Embodiment 1.

Embodiment 2

In Embodiment 1, the carrier wave phase angle is corrected by the correction amount η in response to the supplementary equipment current ISIV. In the present embodiment, the leakage inductance L for power factor compensation is corrected by a correction amount l in response to the supplementary equipment current ISIV. That is to say, in the present embodiment, phase of the signal wave for PWM control is corrected in response to the supplementary equipment current ISIV.

Figure 6:
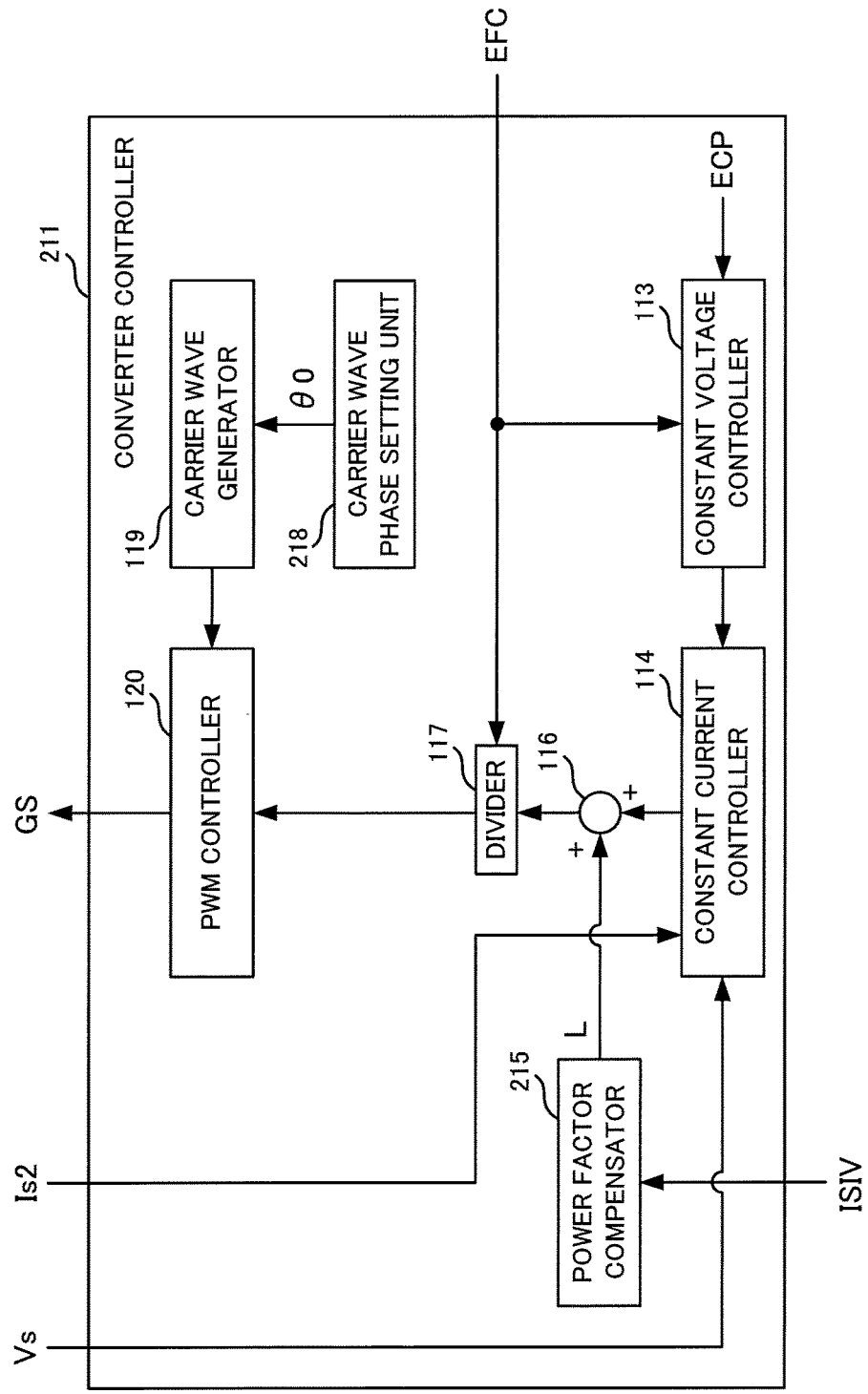
FIG. 6 is a diagram illustrating a configuration of the converter controller of Embodiment 2 of the present disclosure.

The control device of the present embodiment, in place of the converter controller 111 of the control device 100 of Embodiment 1, is equipped with a converter controller 211 of the functional configuration illustrated in FIG. 6. The converter controller 211 of the present embodiment, in place of the carrier wave phase setting unit 118 and the power factor compensator 115 of the converter controller 111 of Embodiment 1, has a carrier wave phase setting unit 218 and a power factor compensator 215.

The carrier wave phase setting unit 218 retains beforehand information indicating the carrier wave phase angle initial value θ0. The present embodiment differs from Embodiment 1 in that the carrier wave phase angle is determined only on the basis of the carrier wave phase angle initial value θ0.

Based on the supplementary equipment current ISIV, the power factor compensator 215 calculates the leakage inductance L used for power factor compensation.

Figure 7:
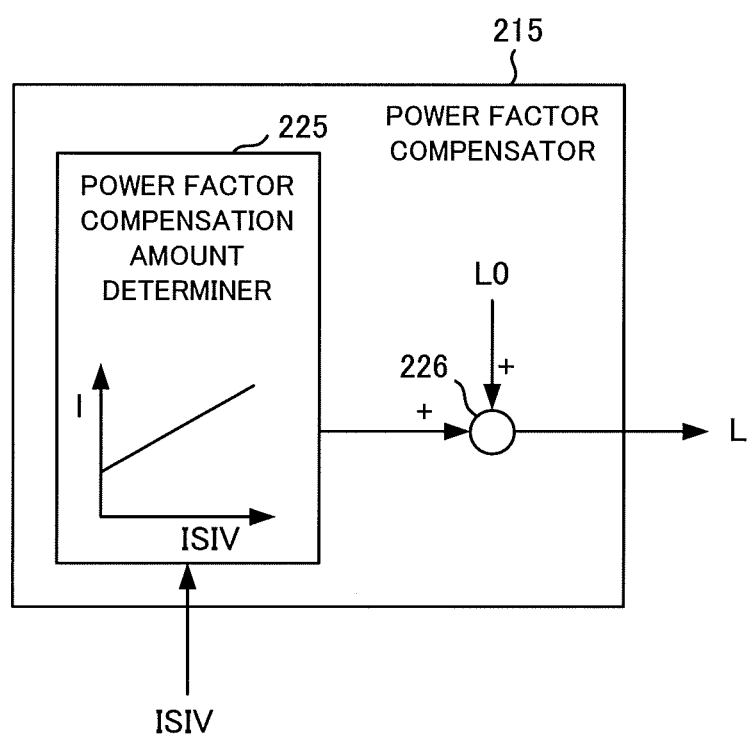
FIG. 7 is a diagram illustrating a configuration of the power factor compensator of Embodiment 2.

In particular, as illustrated in FIG. 7, the power factor compensator 215 has a memory that retains the preset leakage inductance initial value L0, a power factor compensation amount determiner 225, and an adder 226.

The power factor compensation amount determiner 225 retains beforehand leakage inductance correction amount data indicating a relationship between the supplementary equipment current ISIV and the leakage inductance correction amount l.

The relationship indicated by the leakage inductance correction amount data may be expressed as a formula, table and the like, in the same manner as the relationship indicated by the carrier wave correction amount data.

As illustrated in the same figure, in the relationship indicated by the leakage inductance correction amount data, the leakage inductance correction amount l increases as the supplementary equipment current ISIV increases. This type of relationship can be expressed, for example, by a straight line as illustrated in the same figure, in which the supplementary equipment current ISIV is plotted on the horizontal axis and the leakage inductance correction amount l is plotted on the vertical axis. In this case, the rate of the change of the leakage inductance correction amount l with respect to the supplementary equipment current ISIV corresponds to the slope of the straight line. The slope of the straight line may be set to different values for each main circuit controller for which the straight line is set (that is to say, for example, differs for each train car of a train).

When the power factor compensation amount determiner 225 acquires the supplementary equipment current signal acquired from the current sensor 109b, the power factor compensation amount determiner 225 determines the leakage inductance correction amount l on the basis of the supplementary equipment current ISIV indicated by the acquired supplementary equipment current signal and the inductance correction amount data.

The adder 226 adds the leakage inductance initial value L0 and the leaking inductance correction amount l determined by the power factor compensation amount determiner 225, thus calculating the leakage inductance L. The adder 226 outputs a power factor compensation signal indicating the leakage inductance L obtained by the calculation.

In the present embodiment, the leakage inductance L is adopted that is corrected by the leakage inductance correction amount l in response to the supplementary equipment current ISIV. That is to say, the correction amount for correcting the signal wave phase angle is determined in response to the supplementary equipment current ISIV. Thus in the same manner as in Embodiment 1, decrease of the harmonic component of the primary current becomes possible, even when implementation of countermeasures for decrease of mutual inductance between windings of the main transformer 102.

In the present embodiment, the leakage inductance correction amount l increases as the supplementary equipment current ISIV increases. Thus the phase differences of the currents flowing through each of the secondary windings can be maintained at values that decrease the harmonic of the primary current. Thus decrease of the harmonic component of the primary current becomes possible, even without implementation of countermeasures for decrease of mutual inductances between the windings of the main transformer 102.

In the present embodiment, the relationship between the supplementary equipment current ISIV and the leakage inductance correction amount l can be set separately for each main circuit controller. That is to say, for example, when the relationship between the supplementary equipment current ISIV and the leakage inductance correction amount l is expressed by a straight line as illustrated in FIG. 7, the slope of the straight line a value of the leakage inductance correction amount l when the supplementary equipment current ISIV is zero, and the like can be set. Setting in this manner enables including of mutual inductance effects and the like in the relationship between the supplementary equipment current ISIV and the leakage inductance correction amount l. Thus phase differences of the currents flowing through each of the secondary windings can be maintained at values that decrease the harmonic component of the primary current. Thus the harmonic component of the primary current can be decreased even without implementation of countermeasures to decrease the mutual inductances between windings of the main transformer 102.

Modified Example 2

For example, configuration without the carrier wave phase setting unit 218 is permissible, and the power factor compensator 215 may retain an initial value (initial setting value) so as to impart to the signal wave the phase angle corresponding to the initial value θ of the carrier wave phase angle. This type of initial value may be included in the leakage inductance initial value L0. Thus an effect is attained that is the same as in the case of setting the carrier wave phase angle initial value θ.

Modified Example 3

The control device of Embodiment 2, may be equipped with, in place of the carrier wave phase setting unit 218, the carrier wave phase setting unit 118 in the same manner as Embodiment 1. This configuration enables correction of phases of both the carrier wave and the signal wave for PWM control in response to the supplementary equipment current ISIV.

Thus similarly to Embodiments 1 and 2, the phase differences of the currents flowing through each of the secondary windings can be maintained at values that decrease the harmonic component of the primary current. Thus decrease of the harmonic component of the primary current becomes possible, even without implementation of countermeasures for decrease of mutual inductances between the windings of the main transformer 102.

Embodiment 3

In Embodiments 1 and 2, examples are described of determination of the correction amounts of the phase angle of the carrier wave or the signal wave for PWM control, in response to the operating state of the load 104b receiving the supply of power through the tertiary winding. In the present embodiment, an example is described of determination of the correction amount of the phase angle of the carrier wave for PWM control, in response to the operating state of the load 104a receiving the supply of power through the secondary winding.

Figure 8:
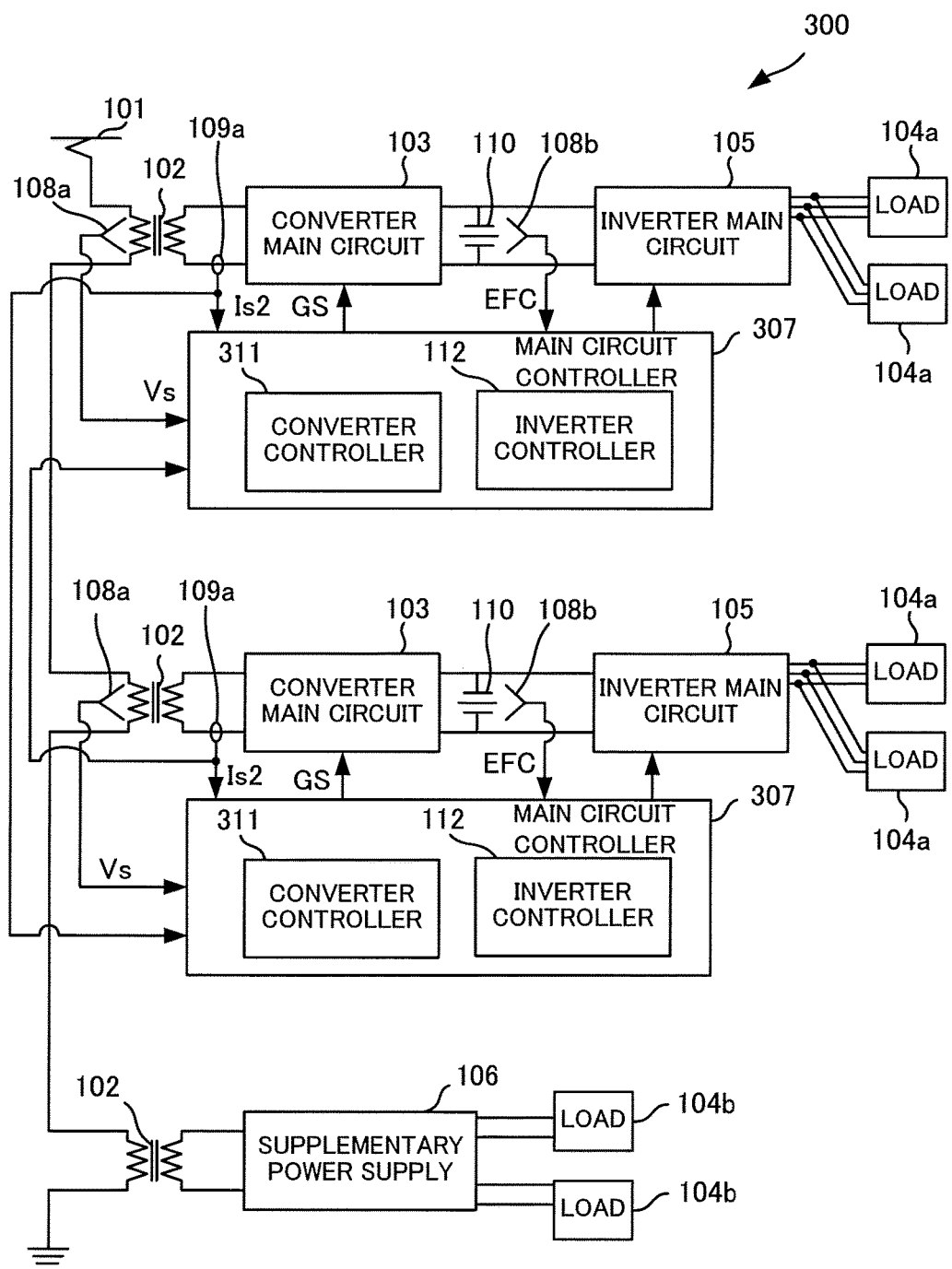
FIG. 8 is a diagram illustrating a configuration of the electric vehicle control device of Embodiment 3 of the present disclosure.

As illustrated in FIG. 8, a control device 300 of the present embodiment is not equipped with the current sensor 109b, and is equipped with a main circuit controller 307 in place of the main circuit controller 107 of the control device 100 of Embodiment 1. As illustrated in the same figure, the main circuit controller 307 of the present embodiment has a converter controller 311 in place of the converter controller 111 of the main circuit controller 107 of Embodiment 1.

Figure 9:
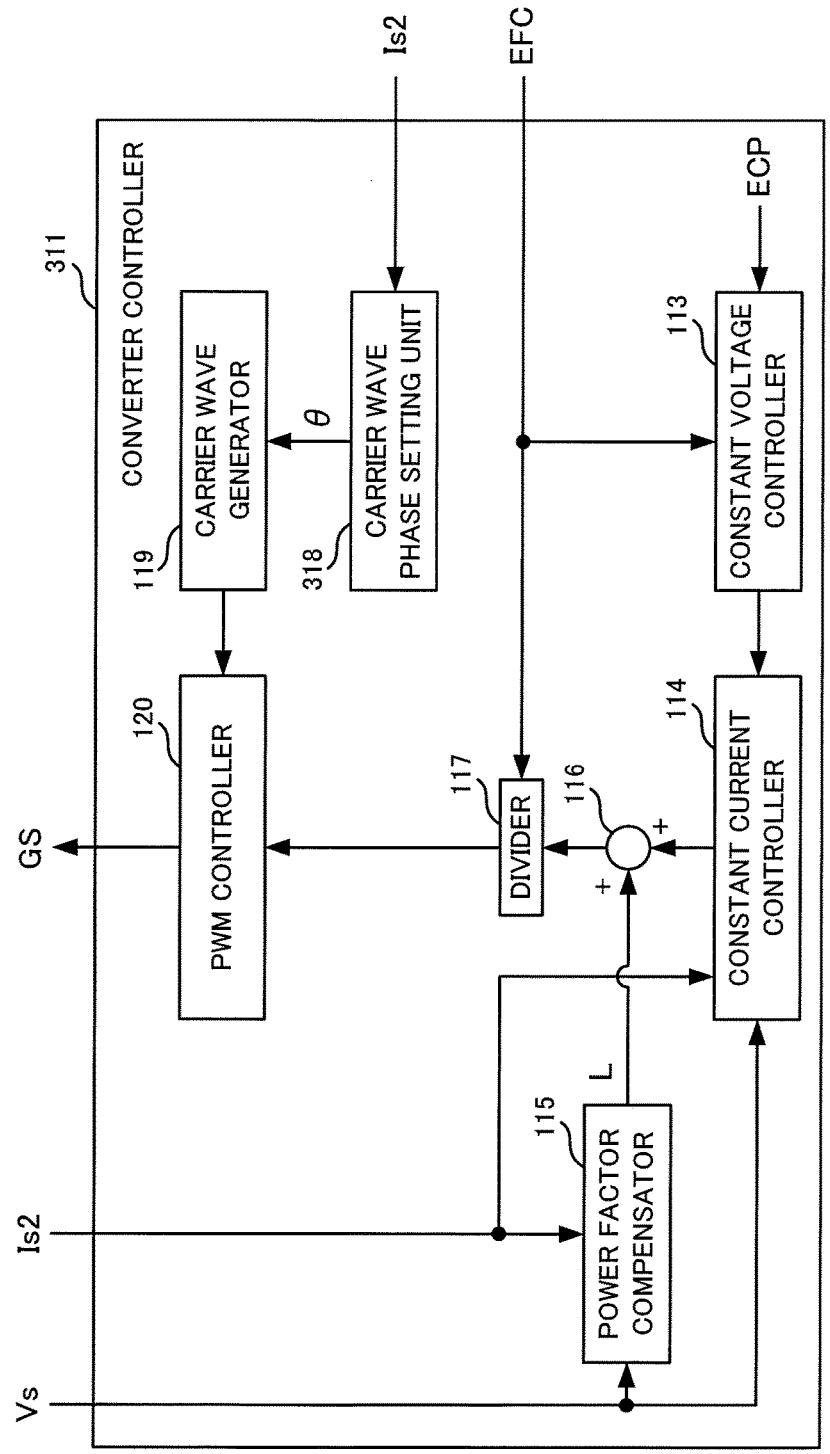
FIG. 9 is a diagram illustrating a configuration of the converter controller of Embodiment 3.

The converter controller 311 of the present embodiment, as illustrated in FIG. 9, has a carrier wave phase setting unit 318 in place of the carrier wave phase setting unit 118 of the converter controller 111 of Embodiment 1.

Figure 10:
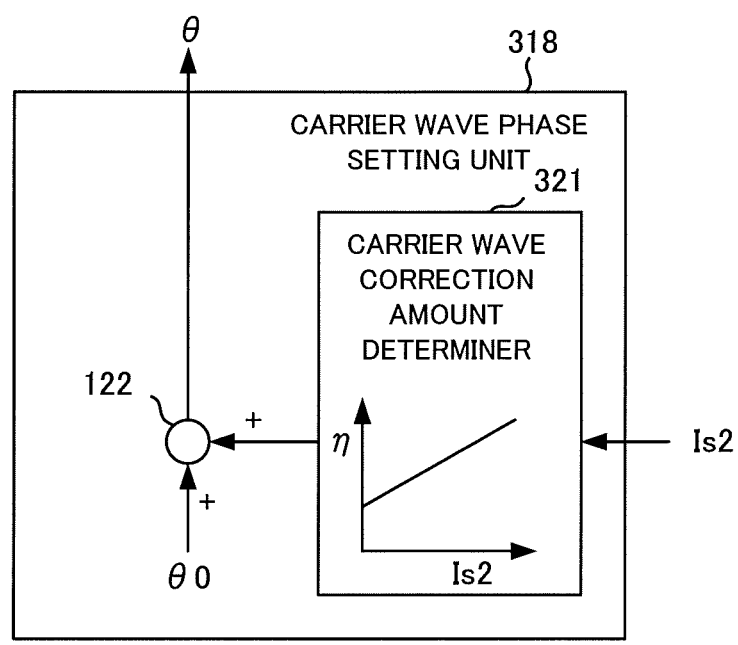
FIG. 10 is a diagram illustrating a configuration of a carrier wave phase setting unit of Embodiment 3.

As illustrated in FIG. 10, the carrier wave phase setting unit 318 of the present embodiment has a carrier wave correction amount determiner 321 in place of the carrier wave correction amount determiner 121 of the carrier wave phase setting unit 118 of Embodiment 1.

As illustrated in FIG. 10, the carrier wave correction amount determiner 321 of the present embodiment determines the carrier wave correction amount η on the basis of the secondary current Is2.

Specifically, as illustrated in the same figure, the carrier wave correction amount determiner 321 retains beforehand carrier wave correction amount data indicating a relationship between the secondary current Is2 and the carrier wave correction amount η. The relationship indicated by the carrier wave correction amount data may be expressed as a carrier wave correction amount data formula, table and the like.

As illustrated in the same figure, the relationship indicated by the carrier wave correction amount data of the present embodiment is a relationship in which the carrier wave correction amount η increases as the secondary current Is2 increases. This type of relationship can be expressed, for example, by a straight line as illustrated in the same figure, in which the secondary current Is2 is plotted on the horizontal axis and the carrier wave correction amount η is plotted on the vertical axis. In this case, the rate of change of the carrier wave correction amount η relative to the secondary current Is2 corresponds to the slope of the straight line. The slope of the straight line may be set to different values for each main circuit controller 107 for which the straight line is set (that is to say, for example, differs for each train car of a train).

The carrier wave correction amount determiner 321 acquires the secondary current signal from the current sensor 109a, and on the basis of the secondary current Is2 indicated by the acquired secondary current signal and the carrier wave correction amount data, determines the carrier wave correction amount η in response to the secondary current Is2.

According to the present embodiment, each of the converter controllers 311 determines the correction amount of the phase angle of the carrier wave for PWM control in response to the secondary current Is2 of the secondary winding that is connected to the converter main circuit 103 controlled by another converter controller 311. Thus the phase of the current flowing through each of the secondary windings of the main transformer 102 can be corrected in response to the secondary current Is2. Thus even in the case in which the secondary windings are strongly coupled to the tertiary winding, the phase differences of the secondary currents occurring due to the effects of mutual inductance can be maintained at values that decrease the harmonic of the primary current. Thus decrease of the harmonic component of the primary current becomes possible, even without implementation of countermeasures for decrease of the mutual inductances between windings of the main transformer 102.

In the present embodiment, the carrier wave correction amount η increases as the secondary current Is2 increases. Thus the phase differences of the currents flowing through each of the secondary windings can be maintained at values that decrease the harmonic of the primary current. Thus decrease of the harmonic component of the primary current is possible, even without implementation of countermeasures for decrease of mutual inductances between the windings of the main transformer 102.

In the present embodiment, the relationship between the secondary current Is2 and the carrier wave correction amount η can be set separately for each of the main circuit controllers 307. That is to say, for example, in the case in which the relationship between the secondary current Is2 and the carrier wave correction amount η is expressed by a straight line as illustrated in FIG. 10, the slope of the straight line, a value of the carrier wave correction amount η when the secondary current Is2 is zero, and the like can be set. Setting in this manner enables including of mutual inductance effects and the like in the relationship between the secondary current Is2 and the carrier wave correction amount η. Thus the phase differences of the currents flowing through each of the secondary windings can be maintained at values that decrease the harmonic component of the primary current. Thus the harmonic component of the primary current can be decreased even without implementation of countermeasures to decrease the mutual inductances between windings of the main transformer 102.

Modified Example 4

The value indicating the operating state of the load 104a being supplied power through the secondary winding as the predetermined output winding of the main transformer 102 is not limited to the secondary current Is2, which is the current (output current) output from the secondary winding. For example, in place of the secondary current Is2, the power consumption of the load 104a, the power (supply power) supplied through the secondary winding, and the like may be adopted as the value indicating the operating state of the load 104a.

The power consumption of the load 104a or the power supplied through the tertiary winding may be calculated on the basis of information from various types of sensors, or may be acquired from a power meter. The power consumption of the load 104a, the secondary current Is2, the power supplied through the secondary winding, and the like, if electronically transmitted to the driver's cab, may be acquired by electronic transmission, and the like from the driver's cab. The present modified example has an effect similar to that of Embodiment 3.

Embodiment 4

In Embodiment 2, an example is described of correction of the leakage inductance L for power factor compensation by using the correction amount l in response to the supplementary equipment current ISIV. In the present embodiment, an example is described of determining the correction amount of the signal wave phase angle for PWM control in response to the operating state of the load 104a being supplied power through the secondary winding. That is to say, in the present embodiment, the phase of the signal wave for PWM control is corrected in response to the secondary current Is2.

Figure 11:
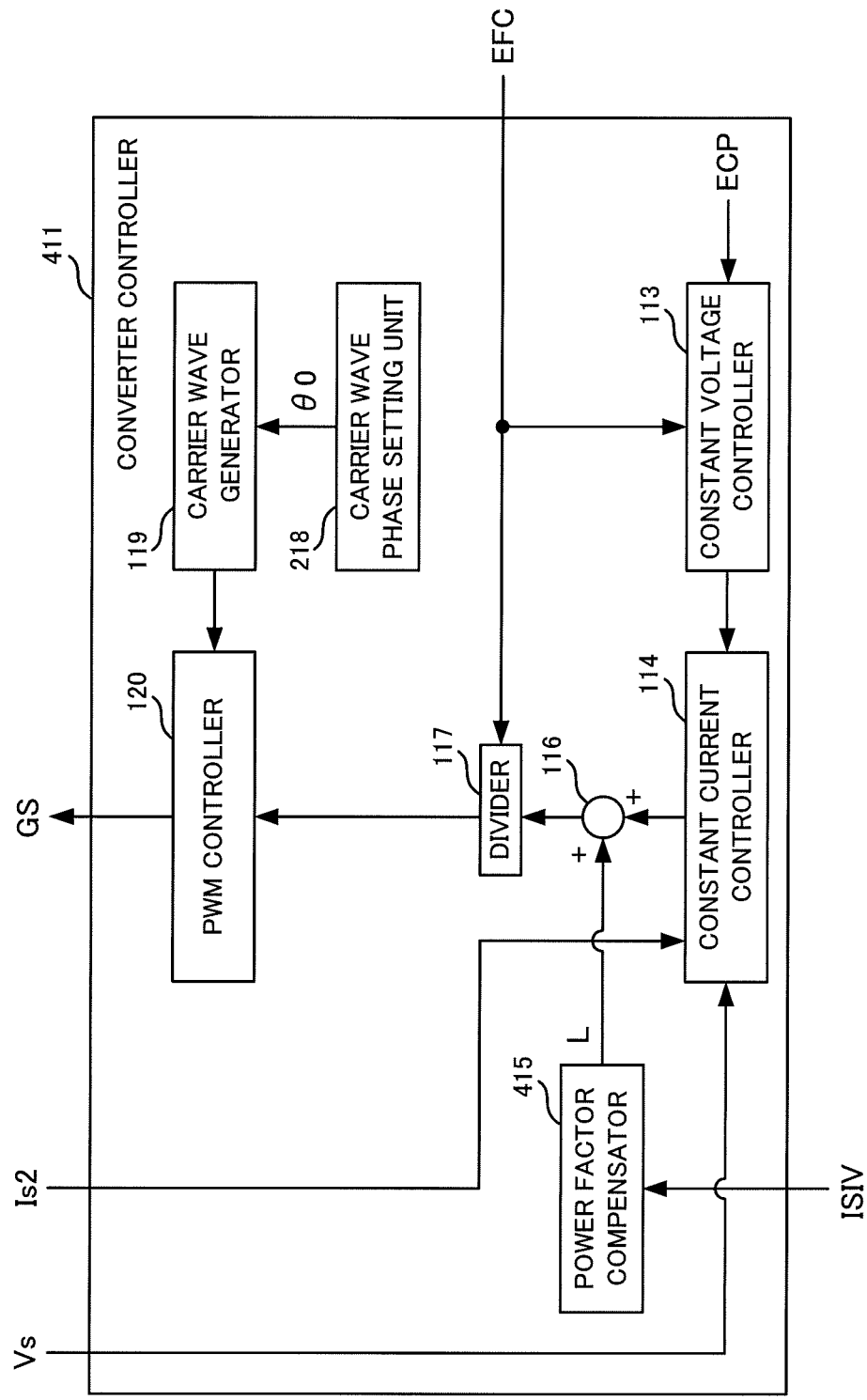
FIG. 11 is a diagram illustrating a configuration of the converter controller of Embodiment 4 of the present disclosure.

In place of the converter controller 311 of the control device 300 of Embodiment 3, the control device of the present embodiment is equipped with a converter controller 411, for which the functional configuration is illustrated in FIG. 11. The converter controller 411 of the present embodiment, in place of the carrier wave phase setting unit 318 of the control device 300 of Embodiment 3, is equipped with the same carrier wave phase setting unit 218 as that of Embodiment 2, and in place of the power factor compensator 115 of the control device 300 of Embodiment 3, has a power factor compensator 415.

Based on the secondary current Is2, the power factor compensator 415 calculates the leakage inductance L for power factor compensation.

Figure 12:
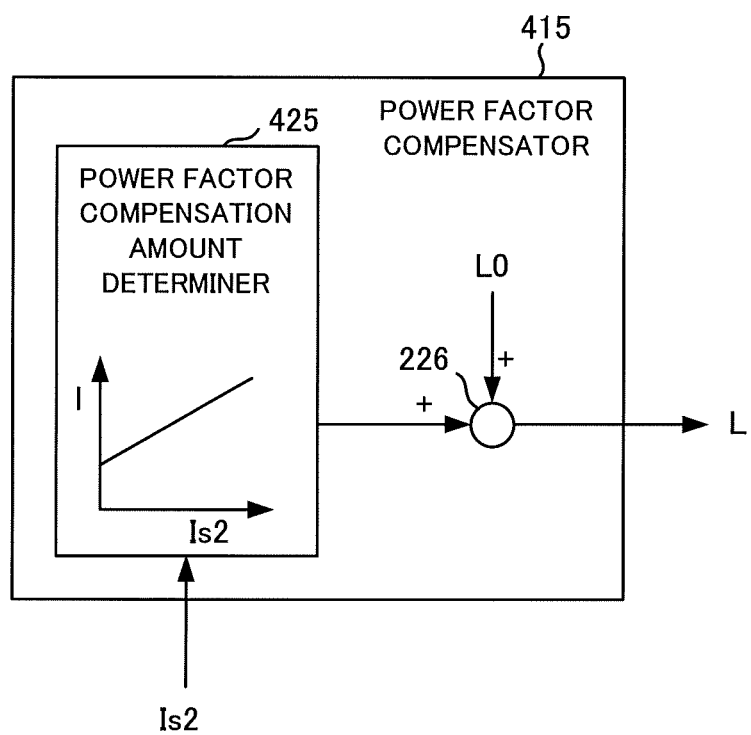
FIG. 12 is a diagram illustrating a configuration of the power factor compensator of Embodiment 4.

In particular, as illustrated in FIG. 12, the power factor compensator 415, in the same manner as Embodiment 2, has the adder 226 and the memory that retains beforehand the leakage inductance initial value L0. In place of the power factor compensation amount determiner 225 of the power factor compensator 215 of Embodiment 2, the power factor compensator 415 has a power factor compensation amount determiner 425.

The power factor compensation amount determiner 425 retains beforehand leakage inductance correction amount data that indicates a relationship between the secondary current Is2 and the leakage inductance correction amount l. The relationship indicated by the leakage inductance correction amount data may be expressed as a formula, table and the like, in the same manner as the relationship indicated by the carrier wave correction amount data.

In the relationship indicated by the leakage inductance correction amount data, as illustrated in the same figure, the leakage inductance correction amount l increases as the secondary current Is2 increases. This type of relationship, as illustrated in the same figure, for example, can be expressed as a straight line in which the secondary current Is2 is plotted along the horizontal axis and the leakage inductance correction amount l is plotted along the vertical axis. In this case, the rate of change of the leakage inductance correction amount l relative to the secondary current Is2 corresponds to the slope of the straight line. The slope of the straight line may be set to a different value for each main circuit controller for which the straight line is set (that is to say, for example, differs for each train car of a train).

This type of power factor compensation amount determiner 425, upon acquiring the secondary current signal from the current sensor 109a, determines the leakage inductance correction amount l on the basis of the inductance correction amount data and the secondary current Is2 indicated by the acquired secondary current signal.

In the present embodiment, the leakage inductance L is adopted that is corrected by the leakage inductance correction amount l in response to the secondary current Is2. That is to say, the correction amount for correction of the signal wave phase angle is determined in response to the secondary current Is2. Thus in the same manner as in Embodiment 1, the harmonic component of the primary current can be decreased, even without implementation of countermeasures for decrease of mutual inductances between the windings of the main transformer 102.

In the present embodiment, the leakage inductance correction amount l increases as the secondary current Is2 increases. Thus the phase differences of the currents flowing through each of the secondary windings can be maintained as values that decrease the harmonic of the primary current. Thus the harmonic component of the primary current can be decreased even without implementation of countermeasures to decrease the mutual inductances between windings of the main transformer 102.

In the present embodiment, the relationship between the secondary current Is2 and the leakage inductance correction amount l can be set separately for each of the main circuit controllers. That is to say, for example, in the case in which the relationship between the secondary current Is2 and the leakage inductance correction amount l is expressed by a straight line as illustrated in FIG. 12, the slope of the straight line, a value of the leakage inductance correction amount l when the secondary current Is2 is zero, and the like can be set. Setting in this manner enables including of mutual inductance effects and the like in the relationship between the secondary current Is2 and the leakage inductance correction amount l. Thus phase differences of the currents flowing through each of the secondary windings can be maintained at values that decrease the harmonic component of the primary current. Thus the harmonic component of the primary current can be decreased, even without implementation of countermeasures for decrease of mutual inductances between the windings of the main transformer 102.

Modified Example 5

The control device of Embodiment 4, in place of the carrier wave phase setting unit 218, may be equipped with the same carrier wave phase setting unit 318 as that of Embodiment 3. This configuration enables correction of phases of both the carrier wave and signal wave for PWM control, in response to the secondary current Is2.

Thus similarly to Embodiments 3 and 4, the phase differences of the currents flowing through each of the secondary windings can be maintained at values that decrease the harmonic component of the primary current. Thus decrease of the harmonic component of the primary current becomes possible, even without implementation of countermeasures for decrease of mutual inductances between the windings of the main transformer 102.

Embodiment 5

In the present embodiment, an example is described in which the correction amount of the carrier wave phase angle for PWM control is determined in response to the operating state of the load 104b being supplied power through the tertiary winding and the operating state of the load 104a being supplied power through the secondary winding.

Figure 13:
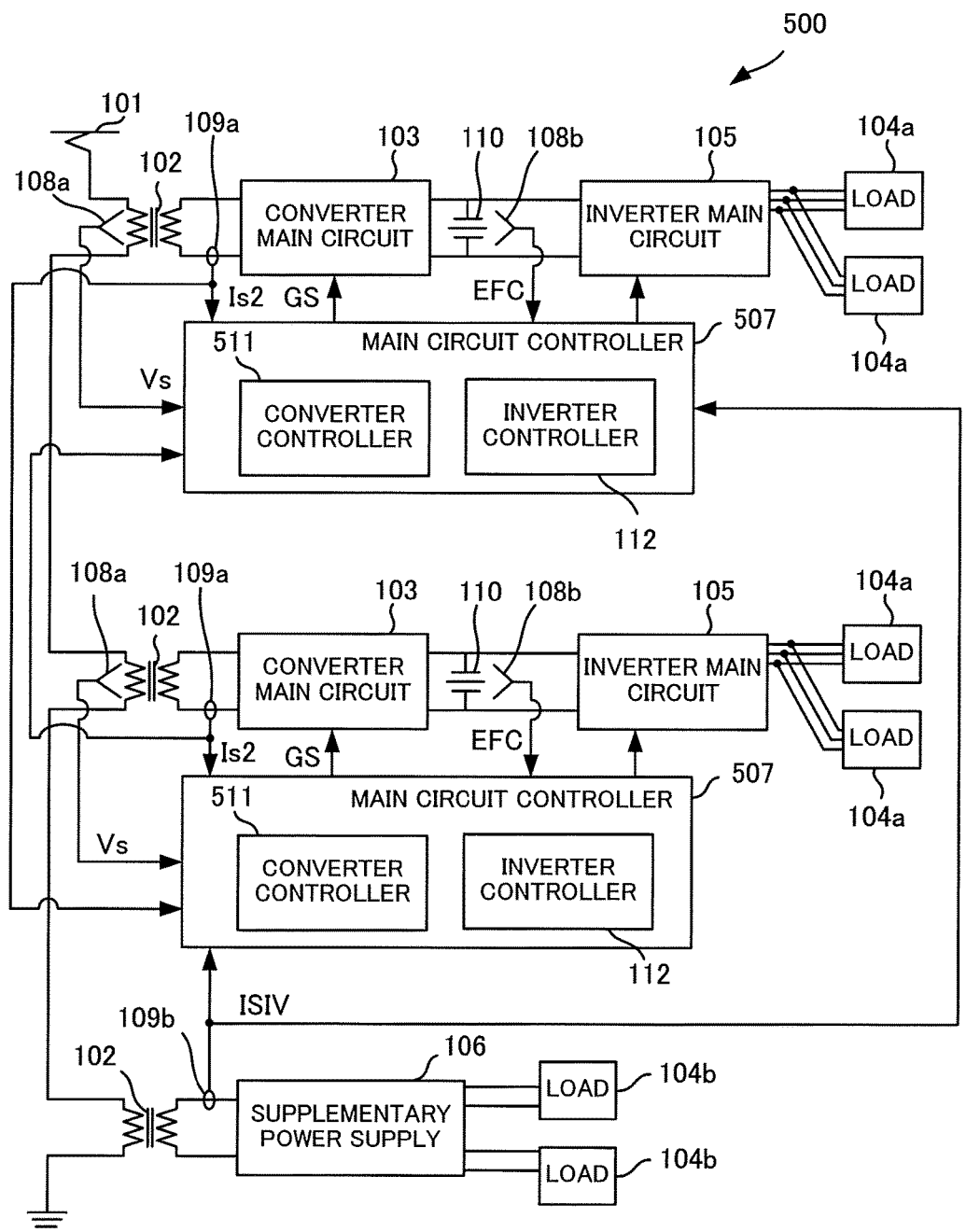
FIG. 13 is a diagram illustrating a configuration of the electric vehicle control device of Embodiment 5 of the present disclosure.

The control device 500 of the present embodiment, as illustrated in FIG. 13, is equipped with a main circuit controller 507 in place of the main circuit controller 107 of the control device 100 of Embodiment 1. The main circuit controller 507 of the present embodiment, as illustrated in the same figure, has a converter controller 511 in place of the converter controller 111 of the main circuit controller 107 of Embodiment 1.

Figure 14:
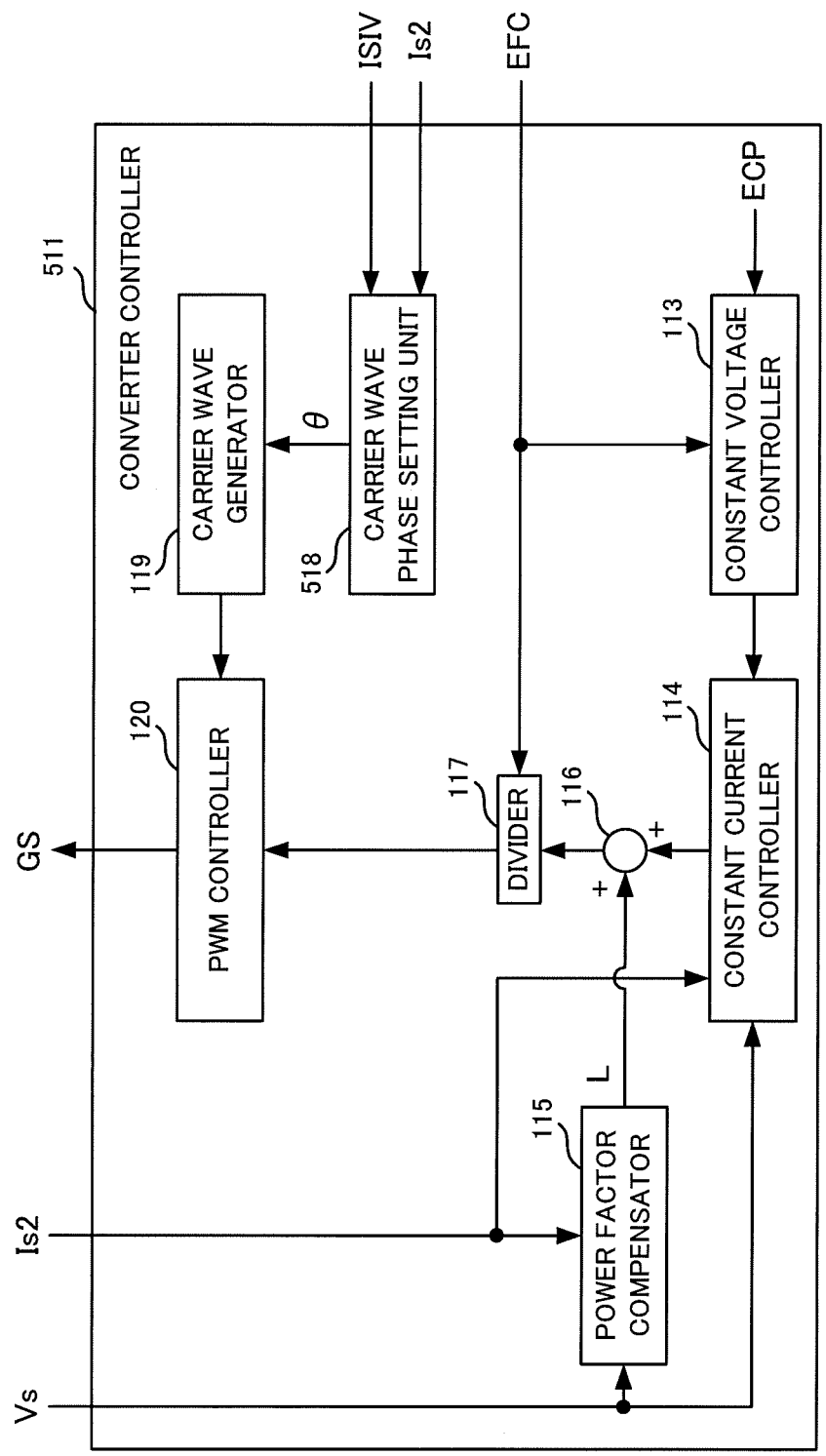
FIG. 14 is a diagram illustrating a configuration of the converter controller of Embodiment 5.

As illustrated in FIG. 14, the main circuit controller 507 of the present embodiment has a carrier wave phase setting unit 518 in place of the carrier wave phase setting unit 118 of the main circuit controller 107 of Embodiment 1.

Figure 15:
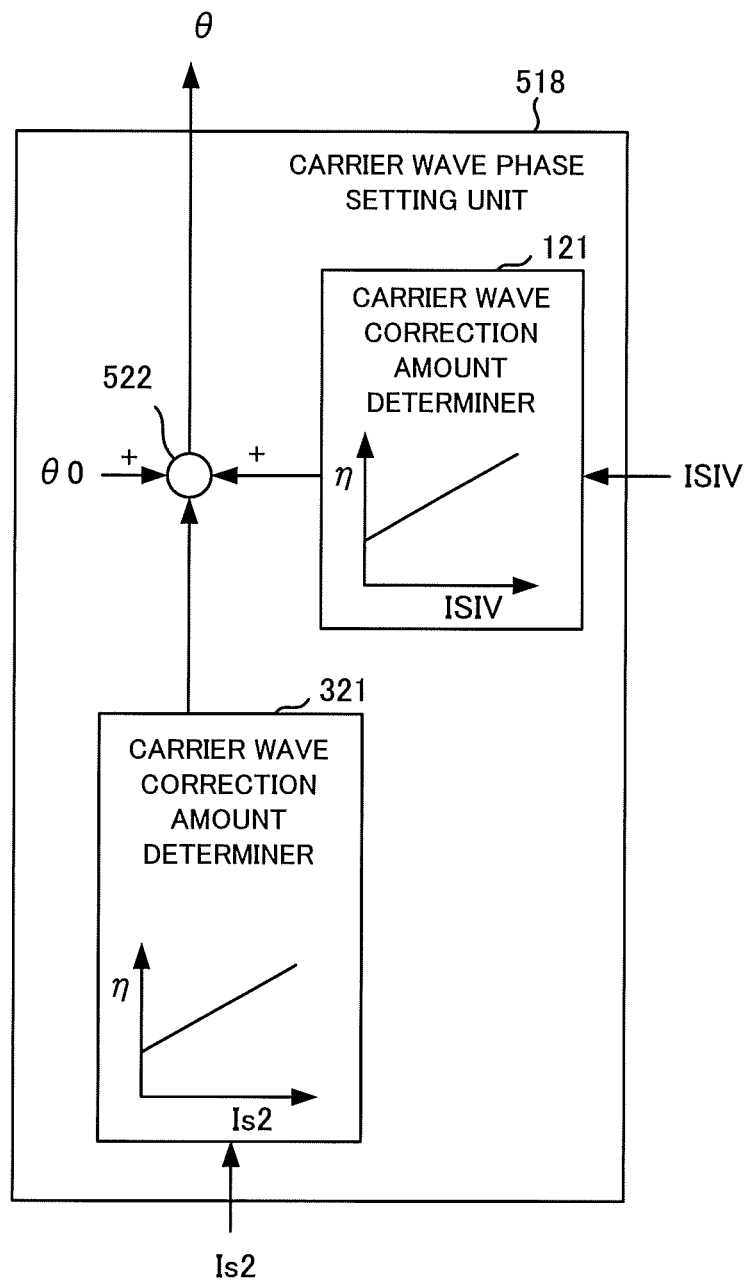
FIG. 15 is a diagram illustrating a configuration of the carrier wave phase setting unit of Embodiment 5.

As illustrated in FIG. 15, the carrier wave phase setting unit 518 of the present embodiment, in addition to the carrier wave correction amount determiner 121 of Embodiment 1, has the carrier wave correction amount determiner 321 of Embodiment 3. The carrier wave phase setting unit 518 has an adder 522 in place of the adder 122 of the carrier wave phase setting unit 118 of Embodiment 1.

The adder 522 adds the initial value θ0 of the carrier wave phase angle, the carrier wave correction amount η determined by the carrier wave correction amount determiner 121, and the carrier wave correction amount η determined by the carrier wave correction amount determiner 321. The adder 522 determines the carrier wave phase angle θ to be the value obtained by addition. The adder 522 outputs, to the carrier wave generator 119, a carrier wave phase angle command indicating the determined carrier wave phase angle θ. Thus the determined carrier wave phase angle θ is set in the carrier wave generator 119.

The present embodiment attains effects that are the same as those of Embodiments 1 and 3. For example, each of the converter controllers 511 determines the correction amount of the phase angle of the carrier wave for PWM control in response to the supplementary equipment current ISIV and the secondary current Is2. Thus the phase of the current flowing through each of the secondary windings of the main transformer 102 can be corrected in response to the supplementary equipment current ISIV and the secondary current Is2. Thus even in the case in which the secondary windings are strongly coupled to the tertiary winding and the secondary windings are strongly coupled together, the phase differences of the secondary currents occurring due to the effects of mutual inductance can be maintained at values that decrease the harmonic of the primary current. Thus decrease of the harmonic component of the primary current becomes possible, even when implementation of countermeasures for decrease of mutual inductance between windings of the main transformer 102.

Embodiment 6

In the present embodiment, an example is described in which the correction amount for the phase angle of the signal wave for PWM control is determined in response to the operating state of the load 104b being supplied power through the tertiary winding and the operating state of the load 104a being supplied power through the secondary winding.

Figure 16:
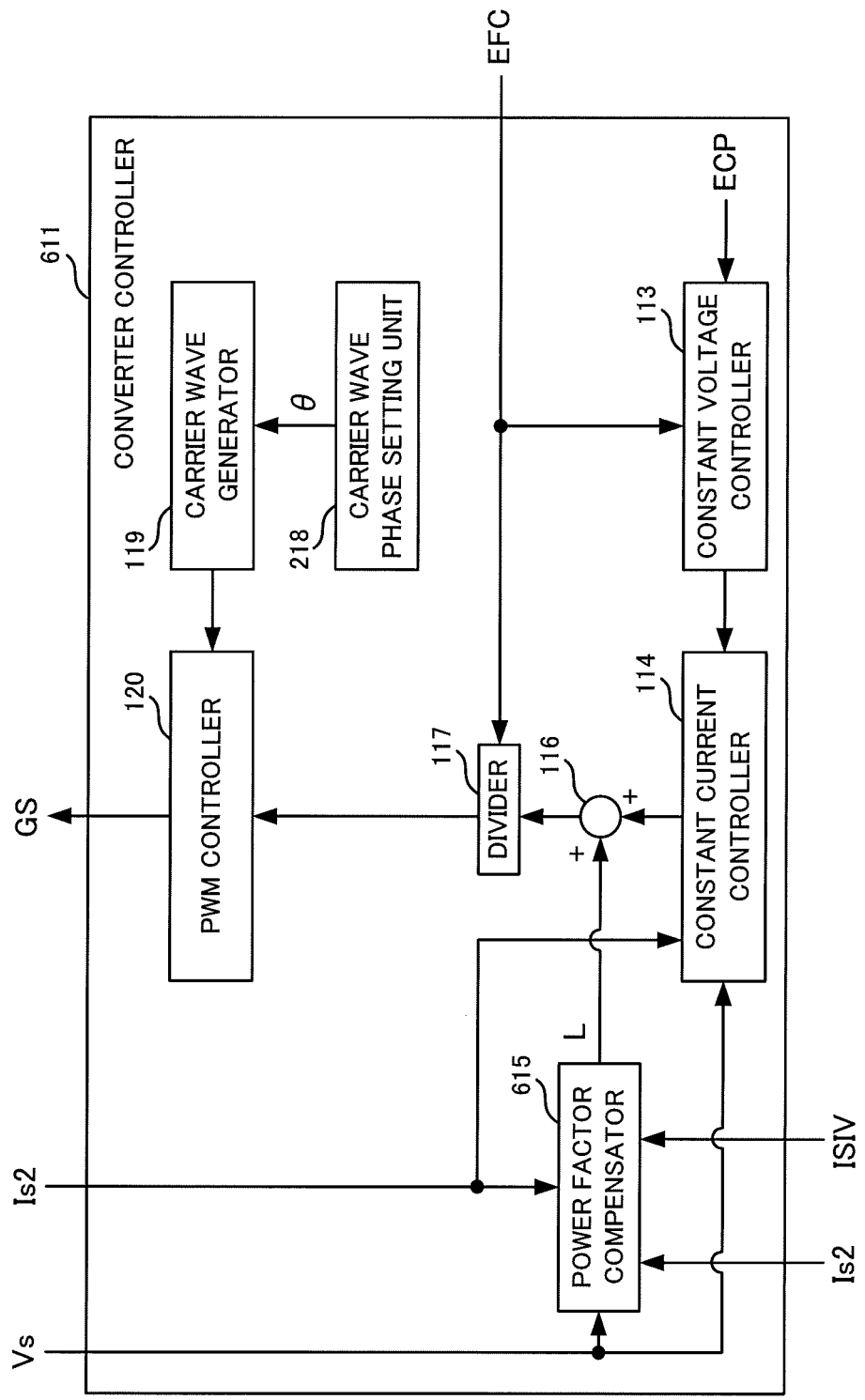
FIG. 16 is a diagram illustrating a configuration of the converter controller of Embodiment 6 of the present disclosure.
Figure 17:
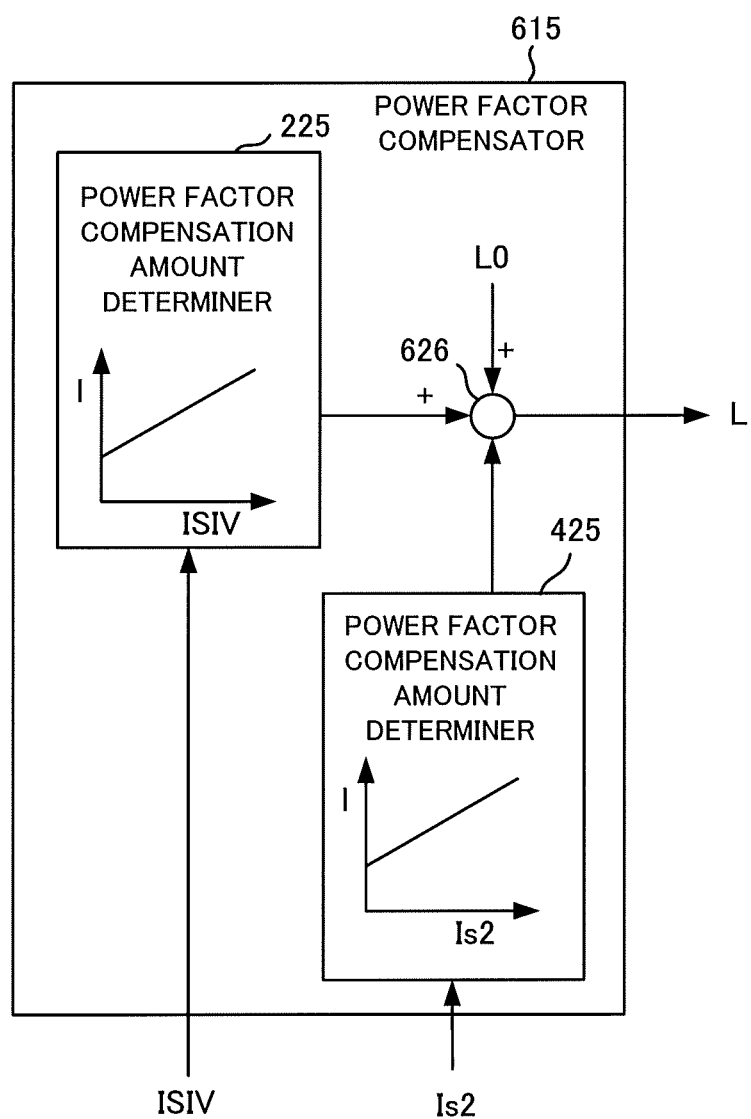
FIG. 17 is a diagram illustrating a configuration of the power factor compensator of Embodiment 6.

The control device of the present embodiment is equipped with a converter controller 611 having the functional configuration illustrated in FIG. 16, in place of the converter controller 511 of the control device 500 of Embodiment 5.

The converter controller 611 of the present embodiment has a carrier wave phase setting unit 218 in place of the carrier wave phase setting unit 518 of the converter controller 511 of Embodiment 5, and has a power factor compensator 615 in place of the power factor compensator 115 of the converter controller 511 of Embodiment 5.

On the basis of the supplementary equipment current ISIV and the secondary current Is2, the power factor compensator 615 calculates the leakage inductance L for power factor compensation.

Specifically, as illustrated in FIG. 7, in the same manner as the power factor compensator 215 of Embodiment 2, the power factor compensator 615 has a memory that retains beforehand the leakage inductance initial value L0, and the power factor compensation amount determiner 225 of Embodiment 2. In addition, the power factor compensator 615 has the power factor compensation amount determiner 425 of Embodiment 4. In place of the adder 226 of the power factor compensator 215 of Embodiment 2, the power factor compensator 615 has an adder 626.

The adder 626 adds together the leakage inductance initial value L0, the leakage inductance correction amount l determined by the power factor compensation amount determiner 225, and the leakage inductance correction amount l determined by the power factor compensation amount determiner 425. The leakage inductance L is calculated in this manner. The adder 626 outputs a power factor compensation signal indicating the leakage inductance L obtained by the calculation.

In the present embodiment, the leakage inductance L that is adopted is corrected by the leakage inductance correction amount l in response to the supplementary equipment current ISIV and the secondary current Is2. That is to say, the correction amount for correction of the signal wave phase angle is determined in response to the supplementary equipment current ISIV and the secondary current Is2. Thus in the same manner as in Embodiment 5, decrease of the harmonic component of the primary current becomes possible, even without implementation of countermeasures for decrease of mutual inductance between windings of the main transformer 102.

Modified Example 6

The control device of Embodiment 6 may be equipped with, in place of the carrier wave phase setting unit 218, the carrier wave phase setting unit 518 in the same manner as in Embodiment 5. Thus the phases of both the carrier wave and signal wave for PWM control can be corrected in response to the supplementary equipment current ISIV and the secondary current Is2.

Thus similarly to Embodiments 5 and 6, the phase differences of the currents flowing through each of the secondary windings can be maintained at values that decrease the harmonic component of the primary current. Thus decrease of the harmonic component of the primary current becomes possible, even without implementation of countermeasures for decrease of mutual inductance windings of the main transformer 102.

Although embodiments and modified examples of the present disclosure are described above, the embodiments and modified examples described above do not limit the scope of the present disclosure. The present disclosure includes suitable combinations of embodiments and modified examples, including appropriate further modifications.

INDUSTRIAL APPLICABILITY

The present disclosure can be used with advantage for an electric vehicle control device, and is particularly useful for electric vehicle control devices in which a pulse width modulation converter device is installed.

REFERENCE SIGNS LIST 100, 300, 500 Control device
102 Main transformer
103 Converter main circuit
104a, 104b Load
105 Inverter main circuit
106 Supplementary power supply
107, 307, 507 Main circuit controller
111, 211, 311, 411, 511, 611 Converter controller
112 Inverter controller
113 Constant voltage controller
114 Constant current controller
115, 215, 415, 615 Power factor compensator
118, 218, 318, 518 Carrier wave phase setting unit
119 Carrier wave generator
120 PWM controller
121, 321 Carrier wave correction amount determiner
225, 425 Power factor compensation amount determiner

The invention claimed is:

1. An electric vehicle control device comprising:
a main transformer to convert an input AC voltage from an AC power supply to an output AC voltage, output from a plurality of output windings;
a plurality of converter main circuits, each connected to one of a plurality of secondary output windings included in the plurality of output windings, to convert the output AC voltage into a DC voltage; and
a plurality of converter controllers, each configured to control one of the plurality of converter main circuits as a control target by pulse width modulation by comparison between a signal wave and a carrier wave, wherein
each of the plurality of converter controllers is further configured to determine a correction amount of a phase angle of at least one of the signal wave and the carrier wave, in response to an operating state of a load that is supplied power through a predetermined output winding among the plurality of output windings.

2. The electric vehicle control device according to claim 1, wherein
the operating state of the load is:
an output current output from the predetermined output winding;
a power consumption of the load supplied power through the predetermined output winding; or
the supply power that is supplied through the predetermined output winding.

3. The electric vehicle control device according to claim 2, wherein
each of the plurality of converter controllers increases the correction amount, as the output current, the power consumption, or the supply power increases.

4. The electric vehicle control device according to claim 3, wherein
a rate of change of the correction amount relative to the output current, the power consumption, or the supply power is different for each of the plurality of converter controllers.

5. The electric vehicle control device according to claim 1, wherein
the correction amount is an amount of correction of an initial setting value of at least one of the signal wave and the carrier wave.

6. The electric vehicle control device according to claim 5, wherein
the initial setting value differs for each of the plurality of converter controllers.

7. The electric vehicle control device according to claim 1, wherein
the plurality of output windings further includes a tertiary winding to connect to a supplementary power supply; and
the predetermined output winding is the tertiary winding.

8. The electric vehicle control device according to claim 1, wherein
the predetermined output winding is a secondary output winding connected to a converter main circuit that is the control target of another converter controller.

* * * * *